United States Patent
Chen et al.

(10) Patent No.: US 7,161,942 B2
(45) Date of Patent: Jan. 9, 2007

(54) METHOD FOR DISTRIBUTING AND CONDITIONING TRAFFIC FOR MOBILE NETWORKS BASED ON DIFFERENTIATED SERVICES

(75) Inventors: Jyh Cheng Chen, Hsinchu (TW); Anthony McAuley, Glen Ridge, NJ (US); Shinichi Baba, Morristown, NJ (US); Yoshihiro Ohba, Cedar Knolls, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 937 days.

(21) Appl. No.: 10/062,908

(22) Filed: Jan. 31, 2002

(65) Prior Publication Data

US 2003/0142681 A1    Jul. 31, 2003

(51) Int. Cl.
*H04L 12/28* (2006.01)
(52) U.S. Cl. .................. 370/392; 370/401; 370/338
(58) Field of Classification Search ............. None
See application file for complete search history.

(56) References Cited

U.S. PATENT DOCUMENTS

2003/0095526 A1* 5/2003 Froehlich et al. ........... 370/338

OTHER PUBLICATIONS

S. Blake et al. "RFC2475: An Architecture for Differentiated Services", 1998, pp. 1-4.*

* cited by examiner

*Primary Examiner*—Chau Nguyen
*Assistant Examiner*—Jung Park
(74) *Attorney, Agent, or Firm*—Joseph Giordano (57) ABSTRACT

A method for distributing and conditioning IP traffic for mobile networks based on differentiated services, wherein edge/border routers are only required to maintain QoS profiles for related mobile stations. A new IP address or a new service level subscription or service level agreement of an mobile station is only sent to related edge/border routers. As a result, unnecessary IP traffic is significantly reduced. The routers in accordance with methods of the invention disregard the contents of an IP payload and therefore all of the IP addresses that a mobile station may posse. A mobile station is permitted to enter into a domain and obtain a desired quality of service (e.g., Gold or Standard service) without the need to maintain the service while moving through the domain.

25 Claims, 6 Drawing Sheets

| UID/PERMANENT ADDRESS | CURRENT IP ADDRESS | QoS PROFILE | QLN/BR |
|---|---|---|---|
|  |  |  |  |
|  |  |  |  |

FIG. 5

| UID/PERMANENT ADDRESS | CURRENT IP ADDRESS | QoS PROFILE |
|---|---|---|
|  |  |  |
|  |  |  |

METHOD FOR DISTRIBUTING AND CONDITIONING TRAFFIC FOR MOBILE NETWORKS BASED ON DIFFERENTIATED SERVICES

BACKGROUND OF THE INVENTION

1. Field of the Invention

The invention generally relates to the use of Mobile Internet Protocol ("IP") systems, methods and protocols in PCS systems and, more particularly, to a method for distributing and conditioning traffic for mobile networks based on differentiated services.

2. Description of the Related Art

Figure 1:
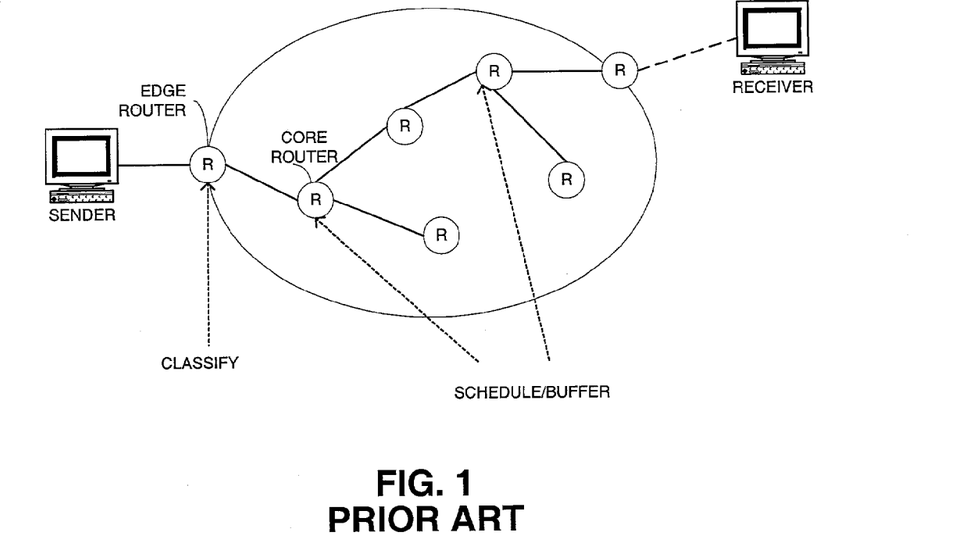
FIG. 1 is an illustration of a network configured to support Differentiated Services.

FIG. 1 is an illustration of a network configured to support Differentiated Services. In such a network, Differentiated Services (DS) or Diff-serv (IETF RFC 2475) is predicated on the concept of classifying data packets, maintaining customer states at the edge of a network and permitting routers at the core of the network to handle aggregates of IP traffic.

IP Version 4 (IPv4) is an Internet Protocol (IP) implementation standard which is in widespread use for transport and control of data and/or voice traffic which is transmitted over wireless and/or wired networks. In IPv4, Diff-Serv utilizes an eight bit type of service (TOS) field in the IP header of transmitted data packets.

In operation, the TOS field (i.e., the DS byte) is set by Diff-Serv capable network interface cards, routers and switches, and is used to differentiate between traffic flow which belongs to different service classes. Diff-Serv operates at network layer (or layer 3). If each network utilizes IP as a common network layer protocol, the data packet scheme and quality of Service (QoS) parameters operate across different networks. DiffServ QoS specifications are recognizable by routers and switches, or any device which may read the IP header and DS byte. The DS byte contains a DS code point, and a tag which specifies the forwarding Per-Hop Behavior (PHB) for the DS byte. PHB is the forwarding treatment which is applied to a specific class of traffic, based on criteria defined in the Diff-Serv field. Routers and switches use PHBs to determine priorities for servicing various traffic flows. In this case, a PHB might specify routing precedence, or it may include other performance characteristics, such as query servicing or management policy.

When data packets enter the network, they pass through a Diff-Serv boundary node (i.e., an edge router or edge node), and then pass through a Diff-Serv core node (i.e., a core router). If the data packets are unclassified, the edge router handles and assigns each packet to a "behavior aggregate". Here, a behavior aggregate is a collection of packets having the same DSCPs (DS code points, i.e., header values) which are members of the same DSCP group and cross a link in a particular direction, where the DSCP group is a set of related DSCPs which select the same PHB group.

Behavior aggregates are each associated with a specific PHB, and are thus subject to parameters described in a Traffic Conditioning Agreement (TCA) between their Diff-Serv domain and a customer access network, or to the peer domain to which they are connected. In addition, the edge router performs important conditioning functions to maintain each PHB such that it is "in profile" with the TCA, such as (i) metering (i.e., measuring the rate of flow of each traffic stream); (ii) marking/re-marking (i.e., resetting the Diff-Serv code point to downgrade any excess traffic); (iii) shaping (i.e., delaying data packets within a traffic stream to maintain conformity of the data flow with the traffic profile); and policing (i.e., discarding packets within a traffic stream such that the correct traffic profile is enforced).

When Diff-Serv is implemented in a wired network, the location of a user is easily obtained. As a result, it is easy to locate the edge/border routers that are needed to condition the traffic for a specific user. In wireless networks, however, users may freely roam anywhere throughout the network. Hence, all edge routers are potentially required to know the QoS profile of all users which are in the domain and those which may roam into the domain.

Typically, it is not feasible to permit each edge/border router to maintain a database which includes all potential mobile users in the world. One straightforward solution to this is to permit all edge/border routers in the domain to maintain QoS profiles for only those users currently within the domain. In this case, the databases are updated when a user enters and leaves the domain. Although this reduces the number of users that an edge/border router must maintain, it is inefficient to maintain identical copies of a potentially large database in all edge/border routers which are located in the same domain. In addition, once a mobile station moves into or out of a domain, or a user changes its Service Level Specification/Service Level agreement (SLS/SLA), the same transactions for updating the database must be performed for all edge/border routers.

Further, a mobile station usually possesses multiple addressees, such as a home address and a "Care-of-Address" (COA). In some mobility management schemes, the COA may also comprise multiple addresses which are different, such as a global COA (GCOA) and a local COA (LCOA). Due to security reasons and other concerns, a router should not change the IP address(es) in an IP packet. This is true even though the router may know the address(es) in an IP header and/or payload.

Of note, only the top header in the IP packet is visible to the router if IP Security Packet with Encapsulating Security Payload (ESP) (RFC 2406)), i.e., IPSec, is employed. That is, the router may only see the COA (or one of the COAs) when the mobile station roams. Therefore, in addition to updating the database when the mobile station moves into or out of the domain, an update is also required when a mobile station requires a new IP address. The mobile station will use this new address to send network traffic, i.e., IP packets.

Depending on the mobility management scheme employed, a corresponding host may use the old or new IP address to communicate with the mobile station. In many cases, an edge/border router must possess the new IP address to condition the traffic at the edge of the DS domain. If the QoS profiles of all users are maintained in the edge/border routers, an update of the database in all edge/border routers often becomes necessary each time a mobile station moves into a new IP subnet. However, at any given time, only a few edge/border routers require possession of the new IP address. Hence, it is apparent that there is a vast amount of unnecessary broadcast traffic and database transactions.

Generally, if the number of users and the number of edge/border routers within a domain is small, then the edge/border routers can maintain the same database for all users which are currently in the domain. Here, if a change in the address of the QoS profile or the arrival/departure of a user occurs, all databases are updated concurrently. As stated previously, on the other hand, it is inefficient to maintain the same database for all users in all edge/border routers. This is particularly true if the domain comprises many users and edge/border routers. This amounts to a waste of storage space, in that the same databases, consisting of all users in the domain, are maintained in all edge/border routers. This also causes unnecessary broadcast traffic and database transactions in all edge/border routers each time a mobile station moves to a new subnet or changes its service level specification or service level agreement (SLS/SLA). In addition, the mobile station is required to negotiate with the network of a conventional system each time a move to a new radio access network occurs, causing a long handoff period without service and increasing load (bandwidth) on the access network. Moreover, the mobile station is not permitted to obtain any service if the radio access network to which the mobile station moves is overloaded.

SUMMARY OF THE INVENTION

The invention is method for distributing and conditioning IP traffic for mobile networks based on differentiated services. In accordance with the invention, edge/border routers that are only required to maintain QoS profiles for related mobile stations are used. In addition, new IP addresses or a new service level specification or service level agreement for a mobile station are only sent to related edge/border routers. As a result, unnecessary IP traffic is significantly reduced. The routers in accordance with methods of the invention disregard the contents of an IP payload and therefore all the IP addresses that a mobile station may posses. In accordance with methods of the invention, a mobile station is permitted to enter into a domain and obtain a desired quality of service (e.g., Gold or Standard service) without the need to maintain the service while moving through the domain. By making decisions centrally (e.g., in a QoS global server), the present invention also permits greater level of flexibility in maintaining the service as a mobile station moves from one location to another. In accordance with the preferred embodiment, each QoS global server uses knowledge of the entire network to ensure service is maintained at whatever level of probability is desired.

In embodiments of the invention, conditioning is performed for both incoming and outgoing traffic from a mobile station. As a result, the traffic is conditioned before entering a domain. In other embodiments, traffic destined to a mobile station is conditioned at the edge of the domain based on the destination address of the IP packet, which is the address of the mobile station prior to its entry into the domain. Similarly, traffic from a mobile station is also conditioned based on its source address, which is also the address of the mobile station, before entering the domain. As a result, "out-of-profile" traffic which is forwarded to a mobile station is unable to enter the domain. In this situation "out-of-profile" traffic occurs when more packets of a particular class than previously agreed to in the service level specification or service level agreement are transmitted to a mobile station.

In accordance with the invention, a method for distributing and conditioning IP traffic for a wireless network comprises the steps of determining a new IP address of a mobile station which enters a new IP domain in a wireless IP network; negotiating for one of a new service level specification and a new service level agreement for the mobile station based on a source IP address of the mobile station at a server in the wireless IP network; providing the new IP address to the server upon completion of the negotiation for one of the new service level specification and the service level agreement for the mobile station; and forwarding the new IP address from the server to a new QoS local node.

In accordance with another embodiment of the invention, a method for distributing and conditioning IP traffic for a wireless network comprises the steps: of checking a database in a QoS Local Node upon receipt of IP traffic destined for a specific mobile station in a wireless IP network; determining whether a corresponding IP address entry for the mobile station is located in the database in the QoS Local Node; requesting the corresponding IP address entry from a database in a sever if the corresponding IP address entry for the mobile station is found within the database in the QoS Local Node; forwarding a response message from the server to the QoS Local Node; treating the IP traffic destined for the specific mobile terminal as best service if the server responds with a "no entry" message; marking DS bytes within IP packet headers of the IP traffic with a type of best service effort, otherwise conditioning IP traffic in the QoS Local Node based on the message sent from the server to the QoS Local Node; and recording an IP address of the QoS Local Node in a database in the server.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF EXEMPLARY EMBODIMENTS

Figure 2:
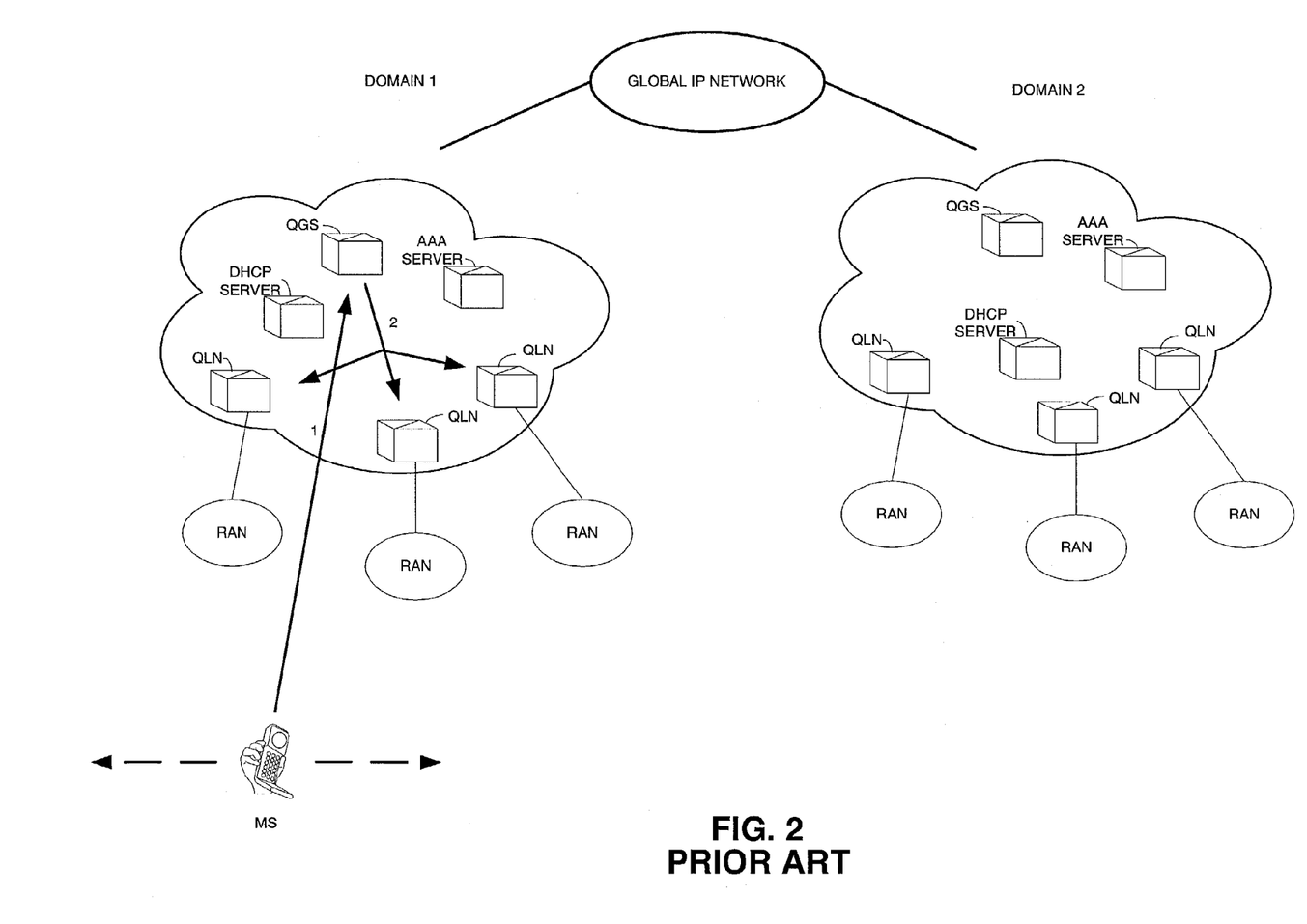
FIG. 2 is an exemplary schematic block diagram of a network configured in accordance with the ITSUMO standard.

FIG. 2 is an exemplary schematic block diagram of a network configured in accordance with the ITSUMO standard, with hosts accessing a Global IP Network via layer 2 radio access networks. Communication in such a system is based on the Diff-Serv protocol model. As shown in FIG. 2, the system includes at least one global server and several local nodes in each administrative domain (e.g., Domain 1 and Domain 2). Here, the server is referred to as the QoS Global Server (QGS), and local nodes are referred to as QoS local nodes (QLNs).

There are three major components of the exemplary system shown in FIG. 2. The mobile station is the device which permits users to interact and communicate via the Global IP Network. Traffic is generated/received by the mobile station and may be "dropped" or "queued" in the mobile station while awaiting the transmission or reception of IP packets.

As shown in FIG. 2, there is one logical QoS Global Server (QGS) in each administrative Domain 1, 2. Each QGS possesses QoS profiles (e.g., Gold or Standard service) of each mobile station which is registered within a specific domain, as well as the global information of the resources available within the entire domain. If necessary, the mobile station interacts with the QGS upon requesting certain QoS parameters in a specific domain. The QGS is the entity which facilitates QoS negotiating and signaling between a mobile station and the control system of the network (not shown), i.e., the QGS is used for controlling the QoS. In addition, the QGS decides what services are available for each mobile station and forwards such decisions to the specific QLNs. Hence, the QGS is an "intelligent" entity which resides in a "control plane" for providing QoS negotiations and signals.

QLNs are ingress routers of the differentiated service (DS) domain, and generally reside on the "edge" of the wired network. With further reference to FIG. 2, a QLN may be part of an edge router, or may reside in a component inside a radio access network, such as a base station.

Typically, the QLN contains local information pertaining to the resources in the local radio access network. However, the QLN does not directly interact with a mobile station for negotiating or signaling purposes. Rather, such "local" information is periodically provided from a mobile station to the QoS global server. The QLN maintains a table which is then periodically updated by the QGS. Based on this table, the QLN will meter, mark/re-mark, shape or police (i.e., condition) the traffic which passes through it. Hence, the QLN provides a transportation functionality. In comparison to the QGS, the QLN is less "intelligent." Nevertheless, one QLN may comprise several cells, but there is typically one QLN in each IP subnet.

The QGS typically retains global information which pertains to the DS domain, and provides QLNs with what action to take when IP traffic enters a domain. A mobile station communicates with the QGS via QoS signaling. Once QoS signaling is complete, the actual IP traffic which is generated by the mobile station is passed through the QLNs. In the configuration shown in FIG. 2, the QGSs are in a "control plane" and the QLNs are in a "transport plane". Here, both the QGS and QLN handle only a part of the QoS functionality. Although all classes of transport traffic are passed through the QLN, it can accommodate each traffic class because each QLN only serves a local radio access network. As a result, an architecture which is flexible accommodates the addition of new features and is more efficient when used within a mobile environment is achieved. Also included are two non-QoS components: a Dynamic Host Configuration Protocol (DHCP) server or a Dynamic Registration and Configuration Protocol (DRCP), and an Authentication, Authorization and Accounting (AAA) server which provides authentication, authorization and accounting services.

Four key characteristic of the system of FIG. 2 are it (i) permits dynamic (i.e., per session) QoS negotiations; (ii) requires no renegotiation or signaling with the mobile station after a move within a domain; (iii) possesses a flexible central server (a bandwidth broker) which negotiates with a user based on up-to-date global information pertaining to the entire administrative domain; and (iv) contains "dumb" ingress nodes which condition users and forward local information back to a central server. Of note, the system architecture of FIG. 2 provides flexibility for different QoS management sessions and is easily integrated into other protocols.

The separation of control and transport functions also enhances the ease with which mobile station mobility support is deployed and maintained. For instance, when new services are required, only the QoS global server must be upgraded. Typically, there is no need to upgrade all QLNs at the edge of the network. Further, if the QoS mechanism malfunctions, then the QLNs only need to be diagnosed after the QGSs, since most of the intelligence resides within the QGSs. Generally, users should only be charged for transport traffic. Hence, the separation of control and transport potentially provides the ability to easily integrate such a feature into a billing system.

The traffic which may potentially pass through the QGS is a QoS signaling message (e.g., dynamic service level specifications negotiation). However, the need to perform this signaling may be only once within the same Domain 1, 2. Other traffic which is passed to the QGS includes exchange messages between a QGS and a QLN. In the system shown in FIG. 2, if one QGS is insufficient for an administrative Domain 1, 2, then multiple QGSs can be deployed.

A service level specification (SLS) or a service level agreement (SLA) is usually agreed to by both the user and the service provider when a user signs up for mobile service. The service provider stores the SLS or SLA in a repository and uses it to condition the traffic flow to or from the user. In conventional systems, in order to change the SLS a user is required to contact and negotiate with the service provider, which then manually enters the changes in a repository, such as a database. Upon completion of the change, the user can then utilize the new SLS. Usually, a service provider permits this kind of re-negotiation or changes only over a large time span, such as once per month.

Currently, there is no network protocol for a user/host to negotiate the SLS with a service provider/network. Generally, it is not only important to automate the process of changing the SLS, but also to do so at a smaller granularity, such as on a per person basis. This is true especially in a mobile environment. For example, a mobile user may roam to a new service provider which has no contact with the mobile user or its service provider. As a result, a service level negotiation may be necessary between the user and the new environment.

Even when roaming within the same domain (i.e., dynamic SLS), there are reasons for supporting dynamic negotiations of SLS, such as:

(i) dynamic SLS permits a more efficient usage of wireless resources. If provisioning is used to predict the number of users in an area, dynamic SLS permits the IP network to change the provisioning in the network and to change the SLS with the user in the event that the provisioning/prediction is incorrect for a particular reason or a special event, such as a large conference or an emergency, where the volume of traffic is much greater then economically feasible. Hence, dynamic negotiation of SLS will potentially maximize the usage of wireless resources; and (ii) a user may use a different device at a different time to access the network, such as a personal digital assistant during the day and a laptop during the evening. The capability and the network resource for these devices are different. Dynamic negotiation of SLS not only permits users to adapt their needs as required, but also permits the service provider to better utilize the IP network. In contemplated embodiments, changes to the SLS/SLA are known by the necessary ingress node (i.e., the QLNs), edge routers (ER), border routers (BR), and the like, within the domain such that the user can fully utilize a new SLS while roaming.

Common Open Policy Service (COPS) protocol or Simple Network Management Protocol can be used as the protocol to enforce the QoS policy in the QLNs, B.S., etc. In instances where COPS is used, QGS represents a Policy Decision Point (PDP), and QLN represents a Policy Enforcement Point (PEP). In other words, the PDP performs governing functions, i.e., creates rules; the PEP performs policing functions, i.e., enforces the rules created by the PDP; and the COPS is a dynamic rule book for passing the rules from the PDP to the PEP. Notwithstanding, there is presently no standard protocol for the user to negotiate with the network (i.e., between the mobile station and the QoS global server). As a result, the mobile station cannot interact with the QGS or PDP while roaming.

Figure 3:
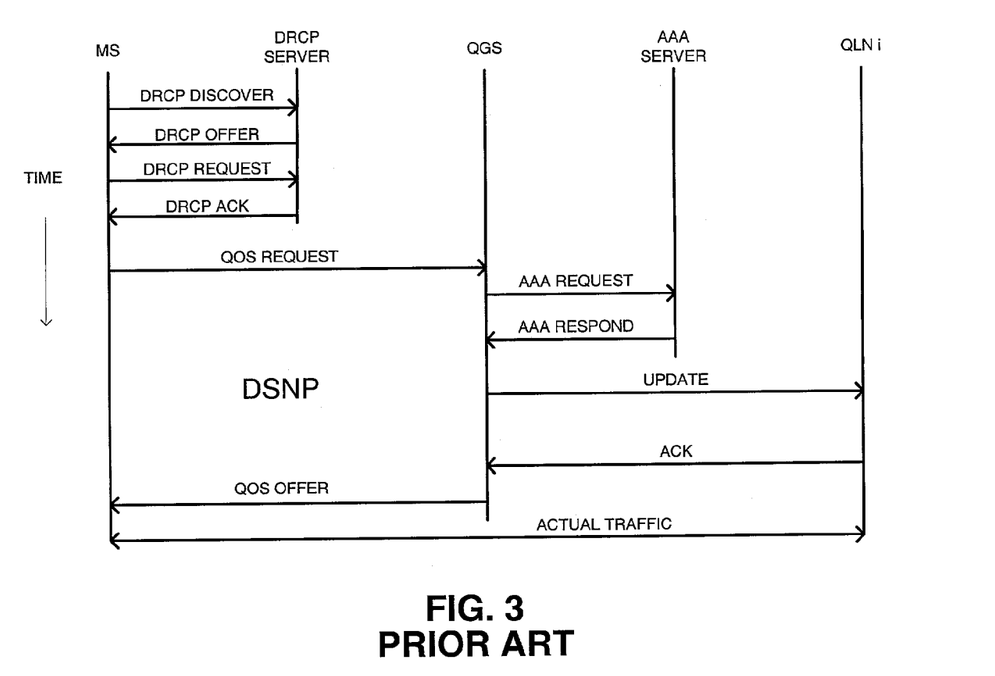
FIG. 3 is an illustration of an exemplary use of Dynamic Service Negotiation Protocol (DSNP) in an ITSUMO based system.

FIG. 3 is an illustration of an exemplary use of Dynamic Service Negotiation Protocol (DSNP) in an ITSUMO based system. DSNP is a protocol which is used for communication between a user and an IP network such that the network can efficiently adapt QoS parameters. Here, the QGS possesses the global information of each mobile station which is located within the domain, as well as the complete topology of the network. Using the global information, the QGS permits the mobile station to dynamically negotiate service level specification configurations. If the mobile station is moved to another domain, the QGS may need to consult with the home station of the mobile station and/or other servers, such as authentication, authorization and accounting (AAA), or the like. Once negotiation between the mobile station and QGS is completed, a new service level specification is sent to the QLNs, the BRs, etc. by the QGS such that the mobile station is capable of utilizing the new service level specification. As a result, dynamic service level specification is achieved easily and efficiently. This dynamic SLS may be performed at different granularity, such as per session, per hour, per day, or the like.

Whenever a mobile station moves into a new IP subnet, it must obtain a new IP address which is specifically assigned to the new IP subnet. In order to facilitate communication over the network, the new IP address must be known by various network entities, such as the mobile station, the edge routers, etc. For example, in mobile IP a home agent must know the new IP address of the mobile station to "tunnel" IP packets to the new location of the mobile station. If such a mobility management is based on another scheme rather than mobile IP, such as Session Initiation Protocol (SIP), a corresponding host and a domain name system (DNS) may need to acquire the new IP address.

Mobility is pervasive within IP networks. Hence, as the number of network devices increase, the number of network entities which require the new IP address of a host will also increase. The new IP address may be sent from a host to another host (e.g., from a mobile host to a corresponding host), from a host to a server (e.g., from a mobile host to a home agent, from a mobile host to a DNS, from a mobile host to a SIP server, from a mobile host to a QoS server, or the like), from a server to another server (e.g., from a DHCP/DRCP server to a DNS server, from a SIP server to a DNS server, from a DHCP/DRCP server to a QoS server), or from a server to a host (e.g., from a DNS server to a corresponding host). Although mobile IP may be used for some of these transfers, mobile IP is not specifically designed for this purpose. In certain embodiments, mobile IP is not required. However, address notification is still required.

Figure 4:
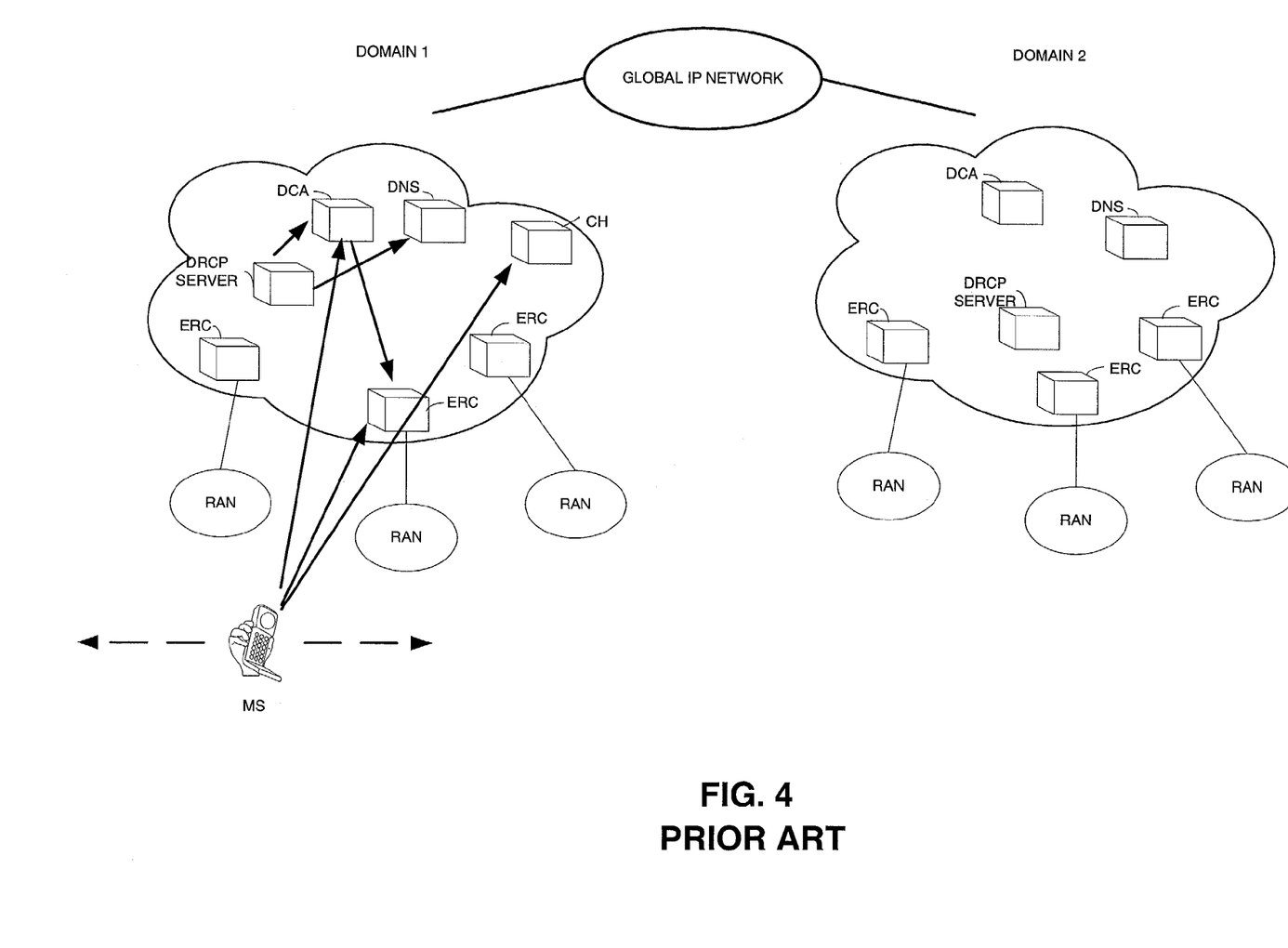
FIG. 4 is an exemplary illustration of a system which utilizes address notification protocol (ANP)

FIG. 4 is an exemplary illustration of a system which utilizes address notification protocol (ANP). Session Initialization Protocol (SIP) is not designed for IP address notification. However, it is possible to use SIP in some limited instances for IP address notification. Generally, communication protocols such as mobile IP and SIP possess many other functional capablitities, such as providing locating services. However, if mobile IP and SIP are used to provide address notification, this additional functionalilty must be added to the protocol. A basic, simple and general protocol which can be used to provide address notification from user-to-user, server-to-server, and user-to-server is address notification protocol (ANP). In such a protocol, once the mobile station obtains a new IP address from the DRCP server, ANP may be used by the mobile station to provide the new address to the domain control agent, edge router and controller (ERC) or the corresponding host. The DRCP server can also use ANP to provide the ERC and the DNS with the new IP address of the mobile station. Similarly, the domain control agent can utilize ANP to provide the ERC with the new IP address of the mobile station.

In current configurations of the Internet, DHCP is widely accepted and deployed. Mobile IP, on the other hand, is mainly a research lab based application. However, as the number of mobile hosts which obtain IP address via DHCP (or variants such as DRCP) increases, a protocol for providing other network entities with new IP address will be needed. ANP may be used by DHCP/DRCP to provide the notification to other network entities once the new IP address is assigned to a host.

In accordance with the invention, a centralized authority which negotiates and maintains a service level specification and QoS profile for all users in a domain is used to manage the service provided to the user. The implementation of the authority may be performed in a distributed manner. In preferred embodiments, however, each domain possesses a centralized authority for service negotiations and the like. Such a centralized authority may also be responsible for billing, pricing and other decisional processes. In preferred embodiments of the invention, the centralized authority is a QoS global server.

The QGS may be a dynamic version of Bandwidth Broker (which is used to admit calls into a telephony network based on IP packet routers) or a policy decision point in a policy-based management framework. As shown in FIG. 2, there are many QoS local nodes (QLNs). Essentially, the QLNs are the edge/border routers of the DS domain. A QLN generally resides on the edge of the network. In contemplated embodiments of the invention, the terminology used is based on the ITSUMO architecture. However, the invention is generic in nature and should not to be limited to only the ITSUMO standard.

Figure 5:
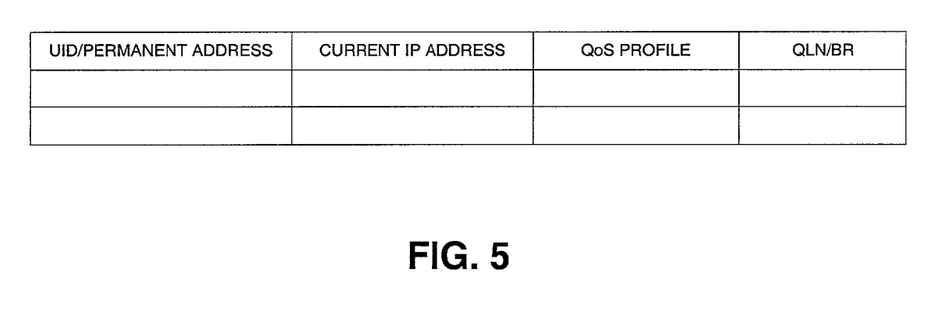
FIG. 5 is an exemplary table which is maintained in a QGS in accordance with the invention.

The exemplary table shown in FIG. 5 is maintained in the QGS. In embodiments of the invention, the first column of this table is either a User ID or a permanent IP address which remains constant for each mobile station. The current IP address of a mobile station is contained in the second column of the table. If a mobile station possesses multiple addresses, then they are all stored. Necessary entities, such as a Foreign Agent, a mobile IP home agent, DHCP servers, DRCP servers, or the mobile station itself, provide the new IP address by using address notification protocol (ANP) or an alternative means, such as mobile IP. It should be noted that it is preferred not to obtain a new IP address from a mobile station unless it is highly trusted or secure because security problems may be created. The third column of the table of FIG. 5 contains a QoS profile of a mobile station.

The fourth column of the table provides an indication of which QLN or border router (BR) is maintaining the QoS profile (e.g., Gold or Standard service) of the mobile station.

Entries of a mobile station within its home domain are permanently stored, unless the mobile station terminates service or is signed off. Entries for a visiting mobile station are added to the table once the visiting mobile station is authorized to enter the domain. On the other hand, "visiting" mobile station information is deleted from the table when the mobile station leaves the domain. The visiting mobile station may negotiate with a QGS once the mobile station is authorized. Alternatively, the QoS profile is maintained in a user and the QGS "learns" the profile from a mobile station.

This, however, may cause security concerns if a user intentionally provides wrong information. Of note, the default behavior of Transport Control Protocol/Internet Protocol (TCP/IP) networks in the absence of QoS measures is best-effort service, i.e., nodes in the TCP/IP will make their best effort to deliver a transmission but will drop packets indiscriminately in the event of congestion managing the bandwidth or assigning priority to delay-sensitive packets. Hence, in the preferred embodiments of the invention hosts with best effort traffic are not included in the table shown in FIG. 5.

Figure 6:
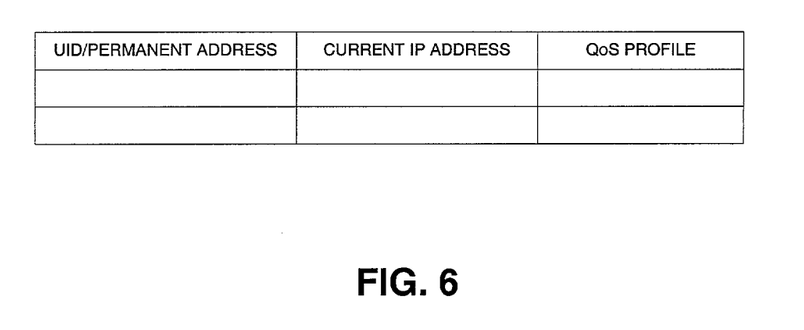
FIG. 6 is an exemplary table which is maintained in QoS local nodes and border routers in accordance with the invention.

FIG. 6 is an illustration of a table which is maintained in the QLNs and BRs. Although this table is similar to the table of FIG. 5 which is stored in a QGS, the table in the QLN or BR only contains mobile station entries or static hosts which the QLN or BR must know. As a result, the size of this table is significantly reduced. Even though the QLN, the border router (BR) and the edge router (ER) are different, they all reside on the edge of the IP network and perform conditioning for the DS domain. In embodiments of the invention, the QLN is used to represent all similar entities. In the preferred embodiment, the similar entities are QLNs, BRs and ERs.

In accordance with an embodiment of the invention, the method of the invention is utilized to distribute QoS profiles (e.g., Gold or Standard service) such that IP traffic sent from a mobile station to the IP network is properly conditioned. Based on the selected service level specification or the service level agreement, the QLN conditions the IP traffic based on a source address, i.e., the prior IP address(es) of the mobile station. When a mobile station moves into a new IP subnet, a new IP address is assigned to it. In embodiments where the mobile station only interacts with a QoS global server for QoS related operations, if necessary the mobile station may use Dynamic Service Negotiation Protocol as set forth in FIG. 3 to negotiate with the QoS global server for a new service level specification or a new service level agreement. ANP is used by the mobile station to provide the QGS with the new IP address of the mobile station. In certain embodiments of the invention, provision of the address updating is unfavorable since a malicious user may then provide misinformation to thereby create security problems.

In the preferred embodiment, ANP is utilized by DHCP/DRCP to provide the QoS global server with the new IP address of the mobile station upon completion of the reconfiguration of the service specification. Based on the new IP address of the mobile station and the IP address of the QLNs, the QGS possesses the address of which QLN the mobile station is interacting with. Here, it is the QGS that forwards the new IP address and the QoS profile to the new QLN. The QGS also instructs the old QLN to delete the corresponding entry for the mobile station. In certain embodiments, Common Open Policy Service (COPS) protocol or Simple Network Management Protocol is used as the protocol between the QGSs and the QLNs. In certain embodiments where address notification is performed by DHCP/DRCP, it is not necessary for the mobile station to send any messages to the QGS while roaming inside the same domain, unless a renegotiation for a new service level specification occurs.

In the preferred embodiment, the entry of the mobile station in the old QLN is deleted immediately after the mobile station leaves the domain. Here, only the new QLN will obtain the entry of the mobile station from the QGS. The update of the database in the new QLN, however, is initiated after the mobile station moves (i.e., begins to roam). In an embodiment, the QGS multicasts a message containing the service profile of a mobile user to a set of potential QLNs in addition to the new QLN to expedite hand-offs.

In accordance with an embodiment of the invention, the choice of a potential set of QLNs is performed on the basis of several different factors. For instance, the neighboring QLNs of the serving QLN can be chosen as the potential set of QLNs because they are the only QLNs that the mobile station can move to. These QLNs receive QoS profiles prior to the entry of the mobile station into the domain. As the mobile station moves from domain-to-domain, the set of potential QLN(s) also changes. Here, the QGS instructs the old QLN(s) to delete the entry of the mobile station from the QGS and instructs the new QLNs to add the entry of the mobile station in the new domain. The QoS profile of the mobile station (e.g., Gold or Standard service) is distributed prior to entry of the mobile station in the new domain. As a result, the new QLN only needs to obtain the new IP address of the mobile station, which may be sent from the QGS or the DRCP server, once the mobile station moves into the new domain. In this case, if the address server (DHCP/DRCP) can configure the new IP address before the mobile station enters the new domain, the new IP address can also be distributed to the potential QLNs ahead of time so that the mobile station can send traffic immediately after handoff. In certain embodiments, all QLNs in the domain are chosen as the set of potential QLNs. However, distributing the QLNs in this manner has associated draw backs, such as the distribution of QoS profiles of all users to all QLNs.

In other embodiments of the invention, the mobile station is not prevented from interacting with the QLN each time it moves into a new subnet. Here, the mobile station may provide the new QLN with its new IP address and QoS profile such that a new QLN may condition the IP traffic. As described previously, for security reasons it is preferable for the QLN to obtain the new address data from trusted network entities, such as a QGS, a DHCP/DRCP server, or the like because the mobile station may provide the QLN with incorrect information such that "snooping" of the contents of IP packets destined for another mobile station becomes possible. In accordance with the preferred embodiments, the mobile station only "informs" the QLN that it is within the coverage area of the new QLN. In this case, if the new IP address of the mobile station is also updated in the QGS, then the new QLN may obtain all of its information (i.e., the QoS profile and the new IP address) from the QGS. Otherwise, the new QLN may obtain the QoS profile from the QGS and the new IP address from the DHCP/DRCP server.

In accordance with an alternative embodiment, the method of the invention is utilized to distribute QoS profiles such that traffic which is destined to a mobile station is conditioned prior to entering the network. Based on the selected service level specification or the service level agreement, the QLN conditions the IP traffic based on a destination address, i.e., the current IP address(es) of the mobile station. As discussed previously, rather than conditioning the IP traffic in the last edge router before it is conveyed to the mobile station, the IP traffic is conditioned before it enters the network.

In accordance with the alternative embodiment of the invention, the corresponding host may reside anywhere within the network. As a result, all the QLNs/BRs are potentially capable of conditioning IP traffic which is forwarded to the mobile station. If the number of users and the number of QLNs/BRs in the domain are small, then in accordance with the embodiments of the invention all QLNs/BRs maintain the same database. Hence, if a change of the IP address or QoS profile of a user occurs, then all of the QLNs/BRs are updated. As noted previously, it is inefficient and redundant to permit all QLNs/BRs in an IP domain to maintain QoS profiles for all hosts in the IP network when the number of QLNs/BRs is large. Therefore, in accordance with the present embodiment, the QLNs request the QoS profile from the QGS only when necessary. In other embodiments of the invention, however, the maintenance and the distribution of all users in all BRs/QLNs is not prevented from occurring.

When the QLN receives the IP traffic which is destined for a specific mobile station, it initially checks its table (shown in FIG. 6). If an entry for the mobile station is not found, the QLN requests an entry from the QGS. If the QGS responds with a "no entry for the mobile station" message, the QLN treats the IP traffic as best effort service, i.e., nodes in a Transmission Control Protocol/Internet Protocol (TCP/IP) will make their best effort to deliver a transmission but will drop packets indiscriminately in the event of congestion while managing the bandwidth or assigning priority to delay-sensitive packets. TCP/IP is a set of protocols developed by the United States Department of Defense for communications over interconnected, sometimes dissimilar, networks and has become the de facto standard for data communications over various networks, including the Internet. (Note: the QGS does not maintain a record of hosts with best-effort service). The DS byte in all packet headers is then marked with the type of best effort.

If an entry for the mobile station is found, on the other hand, the IP traffic is conditioned by the QLN based on what the QGS sends. After sending the entry to the QLN, the QGS records the QLN in the fourth column of the table shown in FIG. 5. Once the mobile station moves to a new subnet, the QGS will obtain a new IP address via ANP which may be initiated by the DHCP/DRCP server or the mobile station. At this point, the QLN(s) has been "booked" in the table. Hence, the QGS has knowledge of which QLN(s) it will need to update with a new IP address. Similarly, the QGS has knowledge of which QLN(s) to update the QoS profile of, if the mobile station negotiates with the QGS for a new service level specification. In certain embodiments, if a mobile station owns multiple IP addresses, then the QLN will condition the traffic for the mobile station based on anyone of them because all of the IP address are booked in the table.

As stated previously, the QLN should only keep entries for active hosts. Therefore, the table is in a soft-state, that is in the preferred embodiment the entry for a host is deleted if the entry is not accessed for an extended period of time, such as three minutes. Concurrently, the QLN also informs the QGS that an entry has not been accessed for an extended period such that the QGS can update column four of the table shown in FIG. 5. If traffic for the mobile station re-enters the IP subnet, the QLN will re-request an entry from the QGS if the specific IP address has been deleted. As a result, out-of-profile traffic is conditioned irrespective of where the traffic arrives from and where the mobile station moves to. In addition, the QLN is not required to maintain a database for all possible hosts. In certain embodiments of the invention, each message is repeated if an acknowledgment within a timeout period does not occur such that a table which is consistent between the QGS and the QLN is maintained.

It should be understood that the invention does not exclude maintaining and updating all users in all edge/border routers. In the preferred embodiment, however, the solution to a large IP domain is scaled, and use of network and storage resources is enhanced.

Figure 7:
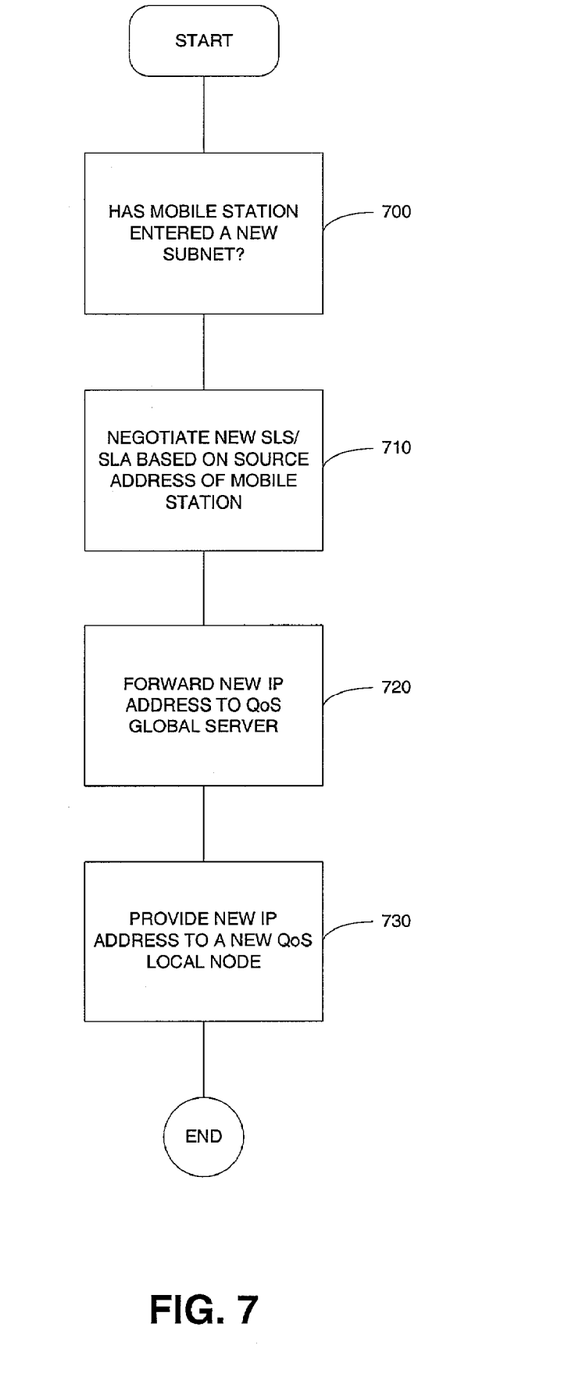
FIG. 7 is a flow chart illustrating the steps of an embodiment of the method of the invention for distributing and conditioning traffic for mobile networks based on differentiated services.

FIG. 7 is a flow chart illustrating the steps of an embodiment of the method of the invention for distributing and conditioning traffic for mobile networks based on differentiated services. In accordance with the invention, the method of the invention is implemented by determining a new IP address for a mobile station upon entry of the mobile station into a new subnet, as indicated in step 700.

A negotiation for a new service level specification or a new service level agreement based on a source address of the mobile station is performed, as indicated in step 710. Here, if necessary, the mobile sation may use Dynamic Service Negotiation Protocol to negotiate for a new service level specification or a new service level agreement.

Next, the QoS global server is provided with the new IP address of the server upon completion of the negotiation for a new service level specification or a new service level agreement, as indicated in step 720. ANP is used by the mobile station to provide the QoS global server with the new IP address of the mobile station. In the preferred embodiment, ANP is utilized by DHCP/DRCP to provide the QoS global server with the new IP address of the mobile station.

The QoS global server also forwards the new IP address and QoS profile to a new QLN, as indicated in step 730. Based on the new IP address of the mobile station and the IP address of the QLNs, the QGS possesses the address of which QLN the mobile station is interacting with. The QGS also instructs the old QLN to delete the corresponding entry for the mobile station. In certain embodiments, Common Open Policy Service (COPS) protocol or Simple Network Management Protocol is used as the protocol between the QGSs and the QLNs.

Figure 8:
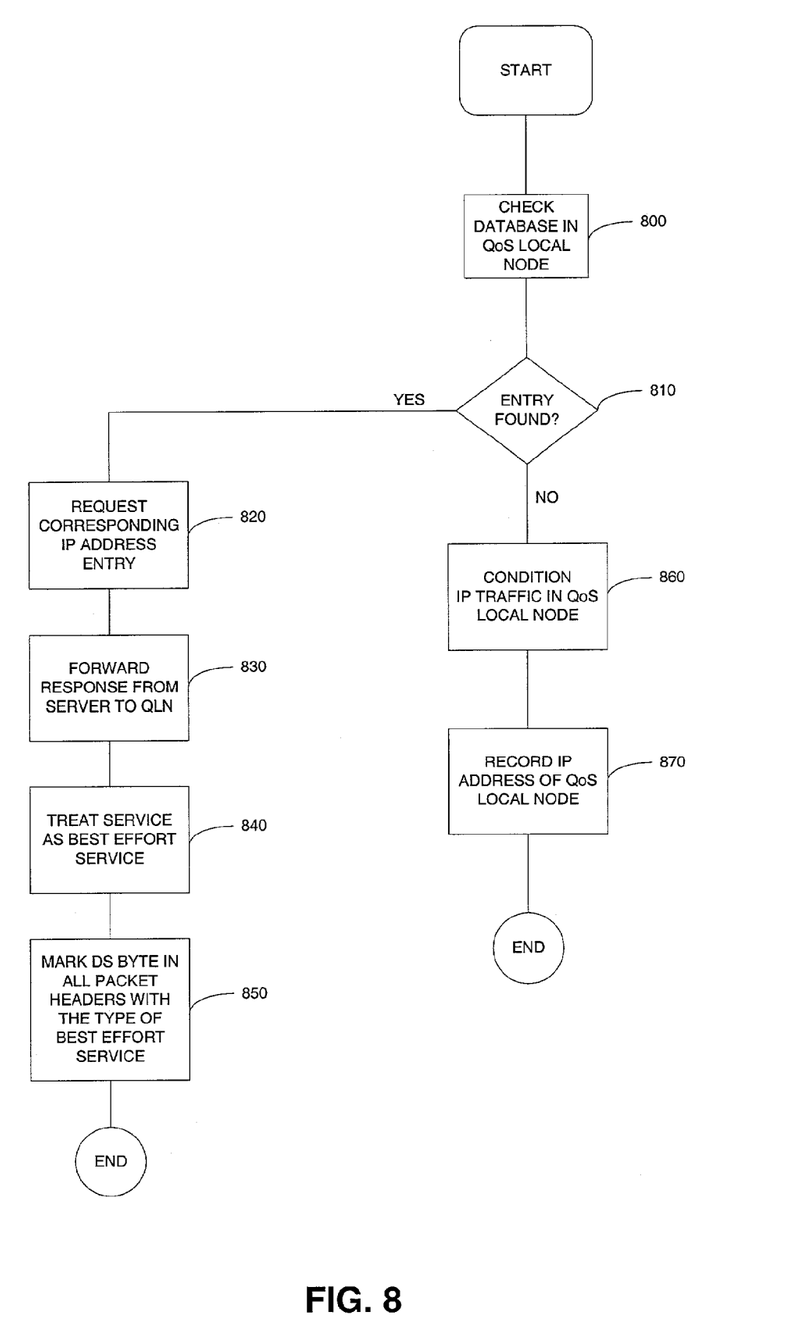
FIG. 8 is a flow chart illustrating the steps of an alternative embodiment of the method of the invention for distributing and conditioning traffic for mobile networks based on differentiated services.

FIG. 8 is a flow chart illustrating the steps of an alternative embodiment of the method of the invention for distributing and conditioning traffic for mobile networks based on differentiated services. In accordance with the invention, the method of the invention is implemented by first checking a database in a QoS Local Node upon receipt of IP traffic destined for a specific mobile station in a wireless IP network, as indicated in step 800.

Next, whether a corresponding IP address entry for the mobile station is located in the database in the QoS Local Node is determined, as indicated in step 810. If the corresponding IP address entry for the mobile station is found in the database in the QoS Local Node, a request for the corresponding IP address entry from a database in QoS global sever is made, as indicated in step 820. A response message from the server is then forwarded to the QoS Local Node, as indicated in step 830. If the QGS responds with a "no entry for the mobile station" message, the QLN treats the IP traffic as best effort service, as shown in step 840. In this case, nodes in the TCP/IP will make their best effort to deliver a transmission but will drop packets indiscriminately in the event of congestion while managing the bandwidth or assigning priority to delay-sensitive packets. The DS byte in all packet headers is marked with the type of best effort service, as indicated in step 850.

If the corresponding IP address entry for the mobile station is not found in the database in the QoS Local Node, then the IP traffic in the QoS Local Node is conditioned based on the message sent from the server to the QoS Local Node, as indicated in step 860. An IP address of the QoS Local Node is recorded in a database in the QoS global server, as indicated in step 870. At this point, the QLN(s) has been "booked" in the table. Hence, the QGS has knowledge of which QLN(s) it will need to update with a new IP address. Similarly, the QGS has knowledge of which QLN(s) to update the QoS profile of, if the mobile station negotiates with the QGS for a new service level specification. In certain embodiments, if a mobile station owns multiple IP addresses, then the QLN will condition the traffic for the mobile station based on anyone of them because all of the IP address are booked in the table.

Methods in accordance with the invention permit a mobile station to enter a domain and obtain a desired service quality (e.g., Gold or Standard service) without the need to maintain the service as it moves through the domain. Methods of the invention also provide each QoS global server with knowledge of the entire network that is used to ensure service is maintained at whatever level of probability is desired.

Although the invention has been described and illustrated in detail, it is to be clearly understood that the same is by way of illustration and example, and is not to be taken by way of limitation. The spirit and scope of the present invention are to be limited only by the terms of the appended claims.

APPENDIX

| | |
|---|---|
| Address Notification Protocol | ANP |
| Authentication, Authorization and Accounting | AAA |
| Border Router | BR |
| Care-of-Address | COA |
| Common Open Policy Service | COPS |
| Differentiated Services | Diff-serv (IETF RFC 2475) |
| Differentiated Service | DS |
| Domain Name System | DNS |
| DS code point | DSCP |
| Dynamic Host Configuration Protocol | DHCP |
| Dynamic Registration and Configuration Protocol | DRCP |
| Dynamic Service Negotiation Protocol | DSNP |
| Edge Router and Controller | ERC |
| Edge Router | ER |
| Encapsulating Security Payload | ESP (RFC 2406) |
| Encapsulating Security | IPSec |
| Global COA | GCOA |
| Internet Protocol | IP |
| IP Version 4 | IPv4 |
| Local COA | LCOA |
| Per-Hop Behavior | PHB |
| Policy Decision Point | PDP |
| Policy Enforcement Point | PEP |
| QoS Global Server | QGS |
| QoS Local Nodes | QLNs |
| Quality of Service | QoS |
| Service Level Agreement | SLA |
| Service Level Specification | SLS |
| Service Level Specification/Service Level Agreement | SLS/SLA |
| Session Initiation Protocol | SIP |
| Transmission Control Protocol/Internet Protocol | TCP/IP |
| Traffic Conditioning Agreement | TCA |
| Transport Control Protocol/Internet Protocol | TCP/IP |
| Type of Service | TOS |

What is claimed is:

1. A method for distributing and conditioning IP traffic for a wireless network, comprising the steps of:
   determining a new IP address of a mobile station which enters a new IP domain in a wireless IP network;
   negotiating for one of a new service level specification and a new service level agreement for the mobile station based on a source IP address of the mobile station at a server in the wireless IP network;
   providing the new IP address to the server upon completion of the negotiation for one of the new service level specification and the service level agreement for the mobile station; and
   forwarding the new IP address from the server only to a new QoS local node necessary to support said new IP domain.

2. The method of claim 1, wherein said negotiating step comprises:
   specifying the new service level specification and the new service level agreement using Dynamic Service Negotiation Protocol.

3. The method of claim 1, wherein said providing step comprises:
   forwarding the new IP address to the server based on Address Notification Protocol.

4. The method of claim 1, wherein the server is a QoS global server.

5. The method of claim 4, wherein the QoS global server is one of a dynamic bandwidth broker and a policy decision point in a policy-based management framework.

6. The method of claim 1, further comprising the step of:
   instructing a prior QoS Local Node to delete a corresponding IP address entry for the mobile station from a database in the prior QoS Local Node.

7. The method of claim 1, further comprising the steps of:
   determining whether a re-negotiation for one of a new service level specification and a new service level agreement is required; and
   sending IP message from the mobile station to the server while the mobile station roams from domain-to-domain in the wireless IP network if the re-negotiation for one of a new service level specification and a new service level agreement is required.

8. The method of claim 1, further comprising:
   deleting a corresponding IP address entry for the mobile station in a database of a prior QoS Local Node immediately after the mobile station leaves the prior domain in the wireless IP network.

9. The method of claim 8, further comprising:
   updating the corresponding IP address entry in the database of the QoS Local Node after the mobile station begins to roam from domain-to-domain.

10. The method of claim 1, further comprising the steps of:
    sending a command from the server to at least one QoS Local Node such that a corresponding IP address entry for the mobile station is deleted from a database in the server; and
    sending a command from the server to the at least one QoS Local Node such that the corresponding IP address entry for the mobile station is added to a database in the at least one QoS Local Node.

11. The method of claim 10, wherein the server is a QoS global server.

12. The method of claim 1, further comprising:
    distributing QoS profiles of the mobile station prior to entry of the mobile station in a new domain.

13. The method of claim 10, wherein the QoS Local node is at least one of an edge router and a border router in the wireless IP network.

14. The method of claim 1, further comprising:
maintaining a database in the server, the database comprising a table containing four columns of data, which at least four columns of data are a User ID which remains constant for each mobile sation, a current IP address of the mobile station, a QoS Profile of mobile station and a flag adapted to indicate which QoS Local Node is maintaining the QoS profile of the mobile station.

15. The method of claim 1, further comprising:
maintaining a database in a QoS Local Node, which database comprises a table containing three columns of data, wherein at least three columns of data are a User ID which remains constant for each mobile station, a current IP address of the mobile station and a QoS profile of the mobile station.

16. A method for distributing and conditioning IP traffic for a wireless network, comprising the steps of:
checking a database in a QoS Local Node upon receipt of IP traffic destined for a specific mobile station in a wireless IP network;
determining whether a corresponding IP address entry for the mobile station is located in the database in the QoS Local Node;
requesting the corresponding IP address entry from a database in a server if the corresponding IP address entry for the mobile station is found in the database in the QoS Local Node;
forwarding a response message from the server to the QoS Local Node;
treating the IP traffic destined for the specific mobile terminal as best service if the server responds with a "no entry" message;
marking differentiated service bytes within IP packet headers of the IP traffic with a type of best service effort,
conditioning IP traffic in the QoS Local Node based on the message sent from the server to the QoS Local Node if the corresponding IP address entry for the mobile station is not found in the database in the QoS Local Node; and
recording an IP address of the QoS Local Node in a database in the server.

17. The method of claims 16, wherein the server is a QoS global sever.

18. The method of claim 17, wherein the QoS global server is one of a dynamic bandwidth broker and a policy decision point in a policy-based management framework.

19. The method of claim 16, wherein the database in the server comprises a table containing four columns of data and wherein the four columns of data are a User ID which remains constant for each mobile station, a current IP address of the mobile station, a QoS Profile of mobile station and a flag adapted to indicate which QoS Local Node is maintaining the QoS profile of the mobile station.

20. The method of claim 16, wherein the database in the QoS Local Node comprises a table containing three columns of data, wherein the at least three columns of data are a User ID which remains constant for each mobile station, a current IP address of the mobile station and a QoS profile of the mobile station.

21. The method of claim 16, wherein said conditioning step comprises:
negotiating for one of a new service level specification and a new service level agreement for the mobile station.

22. The method of claim 16, wherein the QoS Local Node is at least one of an edge router and a border router in the wireless IP network.

23. The method of claim 16, further comprising:
providing a new IP address to the QoS global server once the mobile station moves to a new subnet.

24. The method of claim 23, wherein said step of provided the new IP address to the QoS global server is performed by way of Address Notification Protocol.

25. The method of claim 24, wherein the Address Notification Protocol is initiated by way of one of a DHCP/DRCP server and the mobile station.

* * * * *